(12) United States Patent
Chu

(10) Patent No.: US 10,015,098 B2
(45) Date of Patent: Jul. 3, 2018

(54) SYSTEMS AND METHODS TO CREATE HIGHLY SCALABLE NETWORK SERVICES

(71) Applicant: DELL PRODUCTS L.P., Round Rock, TX (US)

(72) Inventor: Wenjing Chu, Saratoga, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 294 days.

(21) Appl. No.: 14/790,975

(22) Filed: Jul. 2, 2015

(65) Prior Publication Data

US 2017/0005947 A1 Jan. 5, 2017

(51) Int. Cl.
*G06F 15/173* (2006.01)
*H04L 12/803* (2013.01)
*H04L 12/707* (2013.01)

(52) U.S. Cl.
CPC ............ *H04L 47/125* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 6,243,753 B1* | 6/2001 | Machin | H04L 67/14 709/227 |
| 7,187,683 B1* | 3/2007 | Sandoval | H04L 41/142 370/410 |
| 9,563,423 B1* | 2/2017 | Pittman | G06F 9/48 |
| 9,712,427 B1* | 7/2017 | Pittman | H04L 67/1097 |
| 2015/0271303 A1* | 9/2015 | Neginhal | H04L 69/22 370/392 |

* cited by examiner

*Primary Examiner* — Brian Whipple
(74) *Attorney, Agent, or Firm* — North Weber & Baugh LLP

(57) ABSTRACT

Various embodiments of the invention provide for an unparalleled scalable and reliable load distribution design for use in a large class of network applications, including cloud computing in modern data center networks and similar services, which can benefit from the invention by taking advantage of commonly available network components and systems. In particular, various embodiments of the invention extend a logical load distributor model to include distributed clusters of loosely coupled components. Certain embodiments accomplish this by combining existing silicon-based network components and functionalities with the scalability and reliability provided by virtualized processes in order to improve critical load distribution and load balancing performance without requiring costly upgrades to infrastructure and without negative structural impact on the overall network. Some embodiments take advantage of hierarchical designs to further increase scalability.

12 Claims, 14 Drawing Sheets

300

350

1100

SYSTEMS AND METHODS TO CREATE HIGHLY SCALABLE NETWORK SERVICES

BACKGROUND

A. Technical Field

The present invention relates to computer networking and, more particularly, to systems, devices, and methods of scaling computer network services by combining commonly available network components with virtualization software.

B. Background of the Invention

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In modern large-scale computer networks, load distribution is a common and critical task. Many important large-scale information processing systems, such as web services, searching, content streaming, social networks, and cloud services, just to name a few, are designed based on a scaling model that employs a load distribution method. Load distribution processes high volume of work load and intelligently distributes the work load to a collection of servers, such that each server processes only a portion of the overall load using relatively modest and economical computing units, such as commonly available commercial servers.

While this existing scale-out architecture simplifies the overall design, it burdens each individual server and puts a high demand on the load distributor for several reasons. First, the architecture creates a single point of failure and, thus, requires a heightened level of reliability. Next, the load distributor constitutes a single choke point through which all traffic must flow, which requires that the level of performance of the load distributor exceed that of other network components by an order of magnitude. Further, and more importantly, to distribute the load intelligently, the load distributor must read and process high layer information, such as information in the layered Internet architecture. This requirement makes the load distributor central to the network. The resulting tightly coupled topology, significantly increases the complexity of network design thereby rendering the overall network more less stable.

These are some of the biggest problems facing load distributor design, that result in complex and expensive load distributor products, limited scalability, and constrained fragile network topologies. Due to the crucial role load distributors play in large-scale modern systems, these limitations directly impact overall network performance, reliability, and scalability. What is need are tools for network designers to overcome the above-mentioned limitations.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

Figure 1:
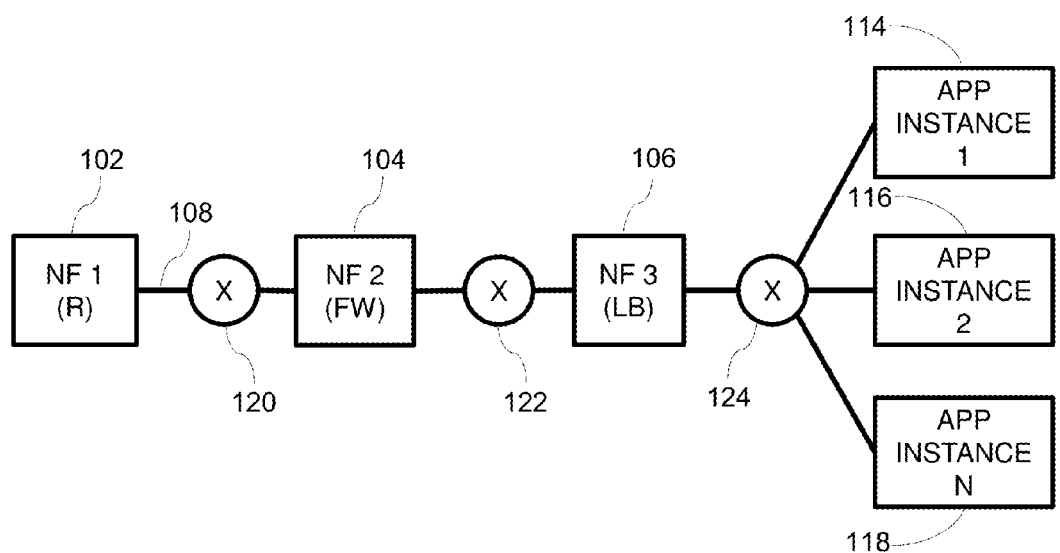
FIG. 1 shows a simplified example of a conventional design for scaling web applications using common network functions.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

FIG. 1 shows an example of a conventional design for scaling web applications using common network functions. System 100 is a simplification and generalization of a design as it may be found in existing large-scale web service systems, such as in networking, telecommunications, mobile, web services, e-commerce, video or content distributions, and the like. System 100 consists of devices 102-106, switches 120-124, and application instances 114-118. Devices 102-106 are hardware components that perform various network functions. System 100 typically uses hardware components, such as routers, firewalls, load balancers, and a rack of servers running software. In FIG. 1, network function (NF) NF1 102 represents a router, NF 2 104 represents a firewall, and NF 3 106 represents a load balancer. Switches 120-124 are standard (e.g., Ethernet) switching elements that are located between devices 102-106 and are connected with wires 108, e.g., Ethernet cables. Switches 120-124 may have built-in hash functions that take header information from ingressing packets and scramble the information while keeping packets that belong to the same flow together to ensure such packets are handled in a similar manner and end up at the same location. Application instances 114-118 are software applications that run on a number of servers.

In operation, traffic, e.g., web requests, is typically routed based on IP address to router 102 that is connected to firewall 104 and passed to switch 122 before arriving at load balancer 106. Load balancer 106 examines the arriving packets to determine, for example, whether the packet is a related to a past transaction, and an associated location for the packet. A scaling of system 100 typically involves numerous duplications of the entirety of system 100, which is complex, costly, and allows for relatively limited scaling of the overall system. Therefore, it would be desirable to minimize the scaling of the hardware components in favor of scaling software components, ideally, without requiring a significant upgrade in network infrastructure.

Figure 2:
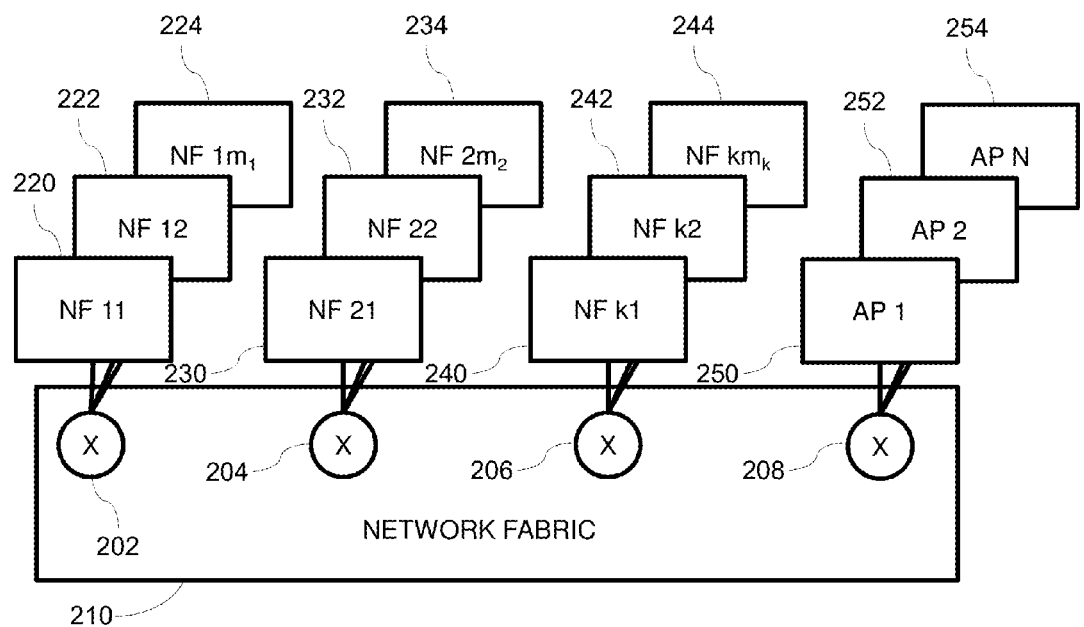
FIG. 2 illustrates a generalized design of an architecture of a scalable system using chained network functions that comprise clusters of application instances, according to various embodiments of the invention.

FIG. 2 illustrates a generalized design of an architecture of a scalable system using chained network functions that comprise clusters of application instances, according to various embodiments of the invention. System 200 comprises switches 202-208 coupled in network fabric 210 that is capable of performing basic transport functions. The design in FIG. 2 comprises a chain of k network functions (NF), NF1, NF2, . . . NFk. Each network function comprising m software instances. For example, NF1 has NF11-NF1$m$1 220-224 software instances that represent services of a router, NF2 has NF21-NF2$m$2 230-234 software instances representing services of a firewall, and NFk has NFk1-NFkmk 240-244 software instances representing services of a load balancer, with k and m being positive integers. Each switch 202-208 is coupled to network function 220-240 and/or application instance 250.

In embodiments, each network function is part of a cluster of network functions. As depicted in FIG. 2, a first cluster, NF1$m$, may comprise network functions NF11-NF1$m$1 220-224, a second cluster, NF2$m$, may comprise network functions NF21-NF2$m$2 230-234, and so on. In embodiments, network fabric 210 allows traffic to flow "sideways" between switches 202-208 to generate horizontal traffic as distinguished from typical tree-like network topologies.

In embodiments, network fabric 210 comprises silicon-based physical devices, such as switches 202-208, that perform transport functions, e.g., via Ethernet cable, while the receiving ends that are connected to physical devices are virtualized network processes.

In operation, the virtualized software processes may run in a data center and collectively perform the equivalent of network functions 220-254, such as load distribution and balancing functions, etc. Packets are received at a network interface (not shown) and processed through network fabric 210. In embodiments, network function 220-244 and application instance 250-254 modules are virtualized and may be scaled similar to any other application software. In this way, system 200 combines common network elements (e.g., switches 202-208) with virtualization software.

In embodiments, virtualization allows network function NF1$m$ 220-224 to logically act, for example, as one or more routers, network function NF2$m$ 230-234 to logically act, for example, as one or more firewalls, and network function NFkm 240-244 to logically act, for example, as one or more load balancers so as to enable the virtualization platform to operate network functions 220-254 anywhere in system 200. As a result, functions of physical devices may thus be performed by virtualization supported on one or more servers that may be located anywhere within system 200 without being limited to expensive and bulky physical hardware.

In embodiments, unlike software that runs on a certain operating system without having control over a network adaptor, the virtualization processes are designed to bypass common layers of software and access one or more buffers in a network adaptor to extract data therefrom and implement logic that simulates the functions of a physical network device. In embodiments, the simulation of network device functions takes advantage of one of a link aggregation mode (e.g., hashing functions) or a routing mode (e.g., Equal Cost Multi Path functions). Either mode may be supported and can be economically implemented via commercially available network equipment. It is noted that variations on specific implementations do not affect the overall architecture of system 200. In short, virtualized processes emulate network functions 220-252 of a Layer 2 switch, a Layer 3 router, etc., to make physical devices in network fabric 210 compatible with the virtualized processes of a non-Application Specific Integrated Circuit (ASIC) environment.

In embodiments, network fabric 210 uses hashing algorithms on packet headers in Layer 2 or 3 to perform basic stateless load distribution on packets received from switches 202-208 in order to load distribute to virtualized entities 220-252. The redistribution to non-physical devices advantageously decreases hardware costs while increasing overall network performance and scalability.

One advantage provided by system 200 is related to scenarios such as Denial of Service attacks, which may cause network functions performing firewall services to become overloaded. In such scenarios, system 200 is able to dynamically scale up the number of necessary network functions that need to be performed. In embodiments, this is accomplished by dynamically allocating additional server resources, for example based on system load feedback, to run additional instances of firewall applications. Therefore, the architecture of system 200 is extendable on demand and within a relatively short period of time. As an example, by allocating more server resources to open more applications, the number of firewall services may be doubled within a matter of milliseconds. As another example, part or all of a general purpose computing unit may be created and deployed for use outside of common data centers, for example, in a base station for wireless applications in the mobile network edge.

Furthermore, services (e.g., firewall services) may be created and used in instances where no such services previously existed. In embodiments, expanded or newly created services are virtually merged into existing ones, while continuing to perform normal services. This allows for easy addition and removal of network functions in a network using system 200 without having to perform cumbersome and costly manipulations on physical devices (e.g., hardware wiring and installing fixed-feature devices) reducing concerns that some critical physical load distributing device, such as an expensive load balancer, may fail and cause major disruption.

Figure 3A:
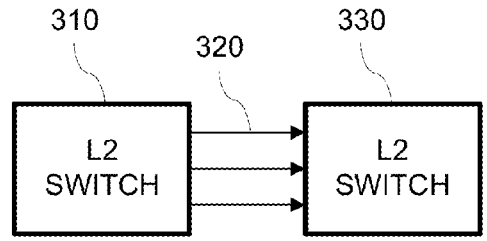
FIG. 3A shows an existing method to interconnect by bundling multiple network connections and distributing traffic load among them in a traditional Layer 2 Link Aggregation configuration.

In Layer 2 and Layer 3 devices, ASICs communicate with each other through a wired connection in a relatively simplistic manner, each ASIC performing traffic distribution through a well-known hashing algorithm. FIG. 3A shows an existing method to interconnect by bundling multiple network connections and distributing traffic load among them in a traditional Layer 2 Link Aggregation configuration. It is noted that although Link Aggregation is typically bi-directional, for purposes of this document, the two directions are viewed individually, depending the direction of data flow under consideration. Typically, a protocol such as the IEEE standard Link Aggregation Control Protocol (LACP) or any similar proprietary protocol provided by a supplier is used to establish a direct device-to-device connection 320 between two switches 310 and 330, respectively, and to automate the configuration process. LACP-like mechanisms rely on Layer 2 frames (e.g., Ethernet frames) and Layer 2 broadcast.

Figure 3B:
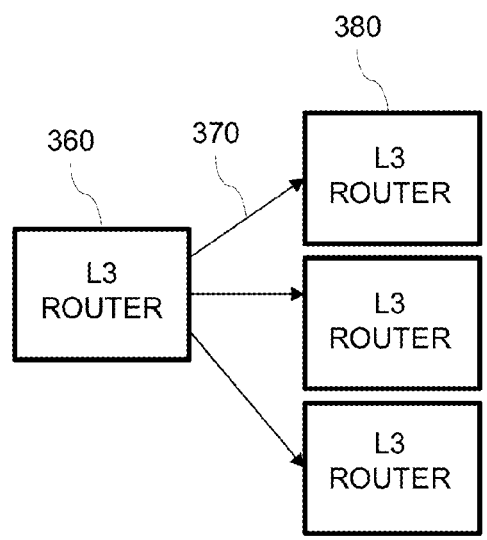
FIG. 3B is an existing method to interconnect by routing and distributing traffic load to multiple equal next hop routers in traditional Layer 3 Equal Cost Multi-Path (ECMP) configuration.

Similarly, FIG. 3B shows an existing method to interconnect in traditional Layer 3 applications, such as ECMP for IP (Internet Protocol) networks. In ECMP systems, typically multiple paths 370 from single router 360 to multiple routers 380 are controlled by routing tables that are either manually configured (static) or populated by a dynamic routing protocol (e.g., Open Shortest Path First (OSPF)).

Unfortunately, neither Layer 2 nor Layer 3 protocols were designed for use in virtualized environments and are, therefore, incompatible with virtualization processes that offer improved scalability. Static routes do not allow dynamic failover. Dynamic routes using a routing protocol such as OSPF require a relatively long time to converge and are not easy to deploy and administer. In contrast, in virtual systems, the underlying infrastructure is often controlled by a different administrative entity, sometimes within the same organization using different network hardware staff. Even if the resulting latency could be tolerated, applying existing control mechanisms to a virtualized environment would still not be practical.

Therefore, it would be desirable to have systems and methods that support combining existing network components with virtualization processes to take advantage of the scalability and reliability provided by virtualization mechanisms.

Figure 4A:
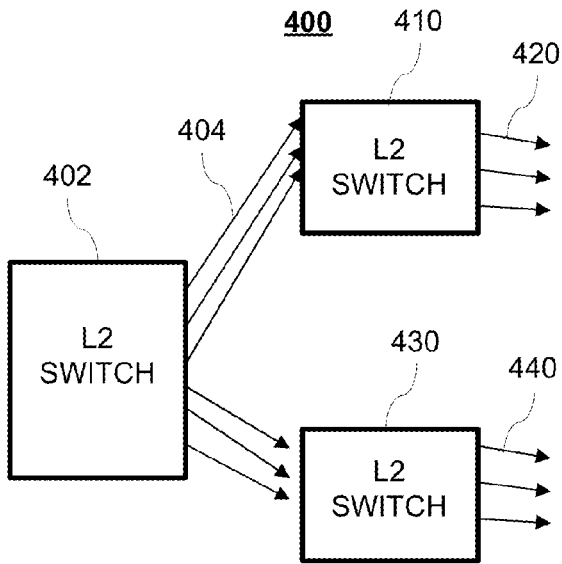
FIG. 4A-B illustrate exemplary communication methods using hierarchical distribution in a network fabric, according to various embodiments of the invention.
Figure 4B:
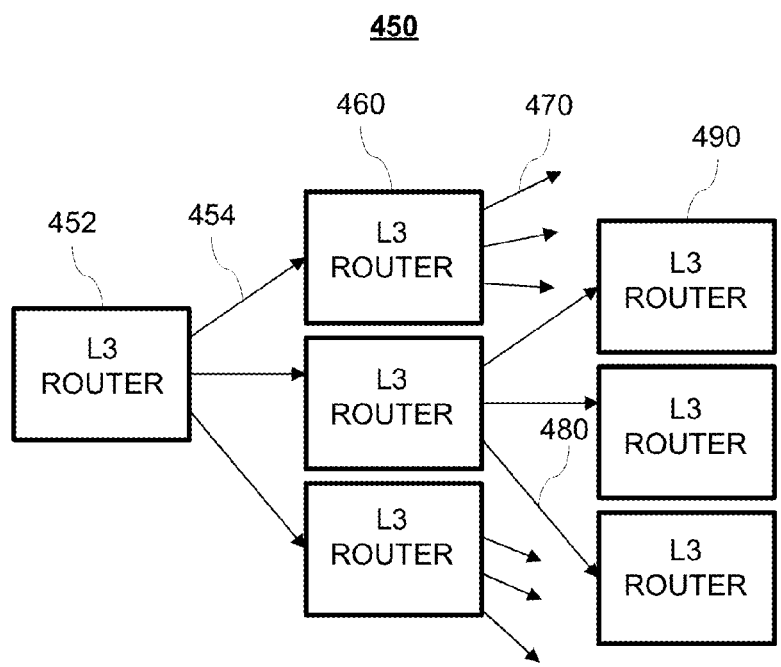

FIG. 4A-B illustrate exemplary communication methods using hierarchical distribution in a network fabric, according to various embodiments of the invention. Unlike the traditional one-to-one connection between two physical switches used in traditional Layer 2 applications as was shown in FIG. 3A or the one-to-many connection between a router and multiple physical routers in traditional Layer 3 applications shown in FIG. 3B, a generalized one-to-many connection system in FIGS. 4A and 4B allow one switch 402 to connect to any desired number of entities 410, 430 for Layer 2-type applications, and to connect router 452 to any desired number of entities 460, 490 in Layer 3-type applications. For example, links 404 may be treated as logically the same entity and may be configured to perform within a single link aggregation group network functions of a Layer 2 network protocol layer and a corresponding link element. Similarly, links 454 may be treated as being logically separate links or IP networks and perform network functions of a Layer 3 network protocol layer and a corresponding port element of a multipath routing arrangement. Responsibilities for each side are defined by novel network and messaging protocols that will be discussed further below.

As shown in FIGS. 4A and 4B, hierarchical system 400, 450 may support multiple tiers. In embodiments, hierarchical systems 400, 450 allow for basic stateless load distribution that may be replicated any number of times to facilitate hierarchical scaling. In hierarchical structure 400, 450, certain functions such as hashing and randomizing may be performed using chip sets of existing low-cost switches instead of using dedicated load balancers, while other functions may be provided mainly by software. As the complexity in a network increases, this approach lowers the cost of hardware components. For example, systems 400, 450 allow to move tasks from a load balancer into software, such that functions of switch 402 and router 452 may be kept relatively simple, e.g., limited to generating and selecting random numbers.

In addition, switches need no longer reside within the same subnet. Rather, a plurality of switching instances may be situated relatively far away from each other within the network. As a further benefit, instructions may be simplified by removing duplicate code. Moreover, in embodiments, certain network functions may be combined with each other or removed entirely to provide even further simplification.

Figure 5:
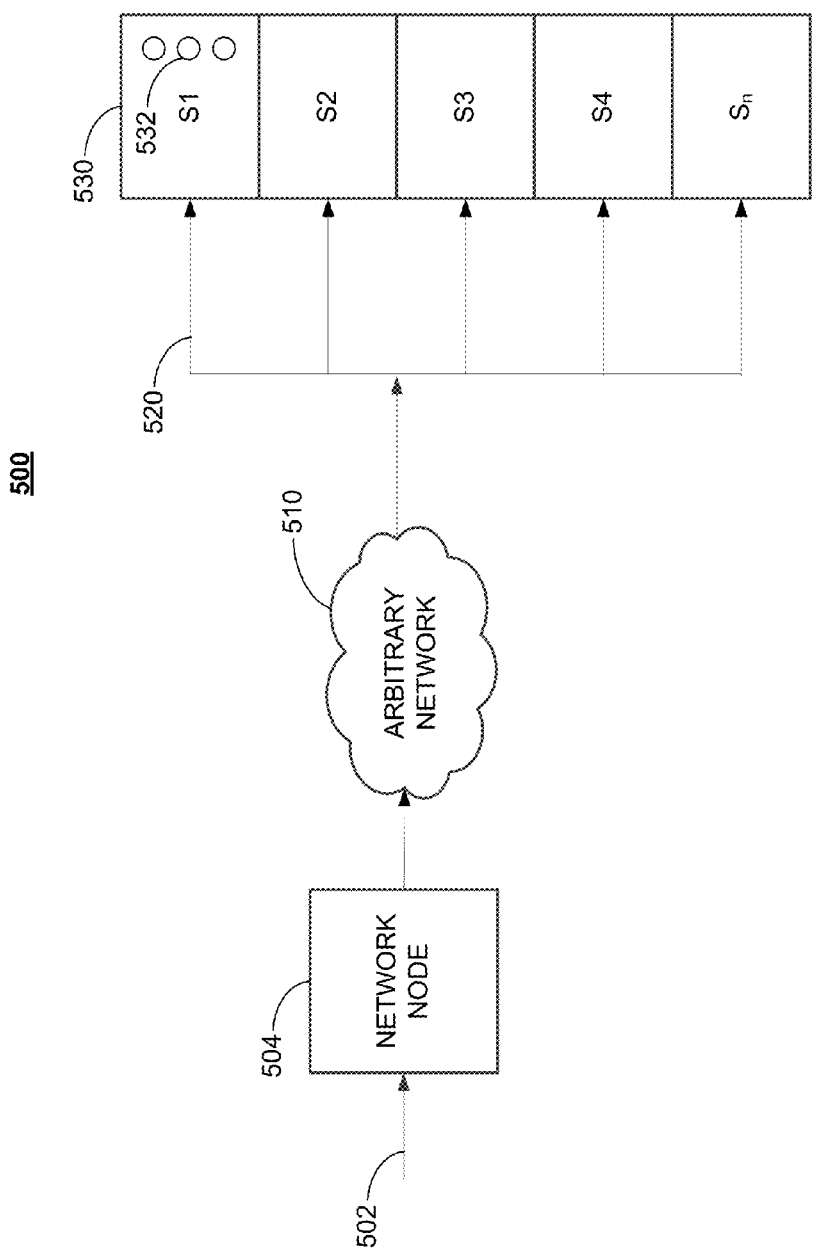
FIG. 5 illustrates an exemplary scalable architecture, according to various embodiments of the invention.

FIG. 5 illustrates an exemplary scalable architecture, according to various embodiments of the invention. System 500 comprises network node 504, network 510, interfaces 520, servers 530 and network engine 532. In embodiments, network node 504 is a physical switch or routing device, for example, and is connected to and forwards ingressing traffic 502 to other devices. Traffic is routed via one or more interfaces 520 to network engine 532 that is used by an application running on server 530. Each server 530 may run multiple instances of various network functions. Ingressing packets may be load balanced at network node 504 as well as on server 530, for example, by a network adaptor that splits the traffic into two or more paths.

In embodiments, network engine 532 is an instance running on server 530 to perform virtualized processes that emulate functions of a function-specific device, such as a router, firewall, and/or load balancer in a virtualized environment. In embodiments, network engine 532 may be dynamically created, added, removed, and combined to extend network 500.

For example, in embodiments, network engines 532 on a particular server, e.g., S4, 530 may be combined to perform load distribution functions as one logical unit according to the structure shown in FIG. 4A. In embodiments, network engines 532 may be combined to perform load distribution functions as separate and distinct logical entities using a structure similar to that shown in FIG. 4B. In embodiments, network engines 532 emulate a network layer pairing and a network load distribution function of a function-specific network device, such as a switch or a router.

Figure 6:
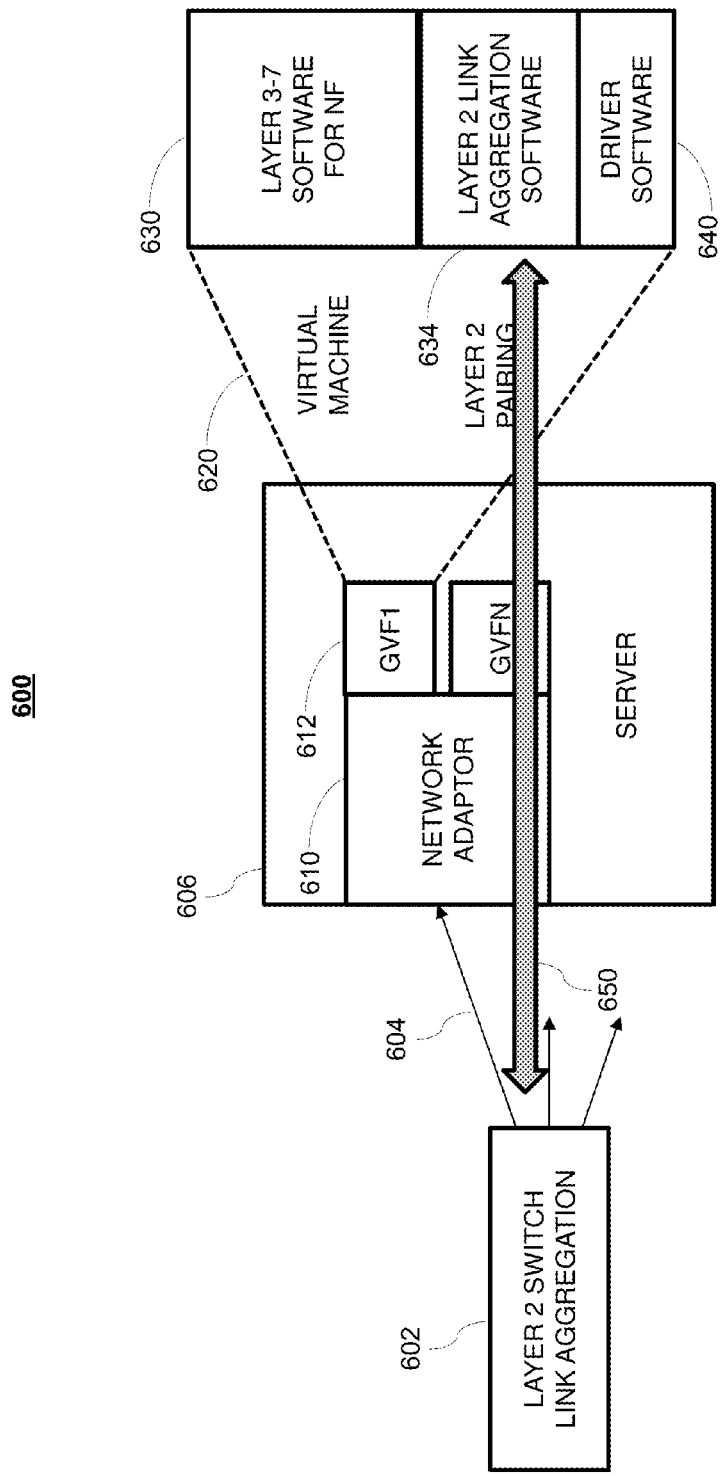
FIG. 6 is a diagram illustrating a virtualized software implementation of the network function VNF for a Layer 2 model, according to various embodiments of the invention.

FIG. 6 is a diagram illustrating a virtualized implementation of a network function in a system using a Layer 2-type model, according to various embodiments of the invention. System 600 comprises switch 602, server 606, network adaptor 610, and virtual machines 620. Switch 602 may be any switch capable of performing Layer 2 link aggregation. Server 606 is any computing unit that comprises network adaptor 610 and configured with one or more virtual machines. In example, in FIG. 6, virtual machines 620 use a software stack comprising Layer 3-7 software 630 for network functions, Layer 2 link aggregation software 634, and driver software 640 to emulate a network engine. In embodiments, switch 602 is connected to server 606 via logical link 604 and network adaptor 610 located within server 606. Network adaptor 610 may be logically split into virtual ports with generalized virtual functions (GVFs) GVF1, GVF2, . . . GVFn 612, with n being a positive number, and be configured to distribute traffic accordingly. Virtual machine 620 is configured to receive traffic via virtual port GVF1 612 and pair switch 602 with Layer 2 link aggregation software 634 with respect to virtual port GVF1 612. In embodiments, once traffic reaches software 634, software 634 performs link aggregation, e.g., on link 604 located between software 634 and server 606 and subsets of traffic destined toward virtual port GVF1 612.

Network adaptor 610 is a generalized network end-device, such as a NIC or a network switching element. In embodiments, network adaptor 610 uses GVFs 612 to distribute load between multiple virtual machines 620 in server 606, for example, by splitting traffic so as to emulate multiple network adaptors. In addition to network adaptor 610, any physical device (not shown) in system 600 may perform load distribution to further extend scaling of the network.

Figure 7:
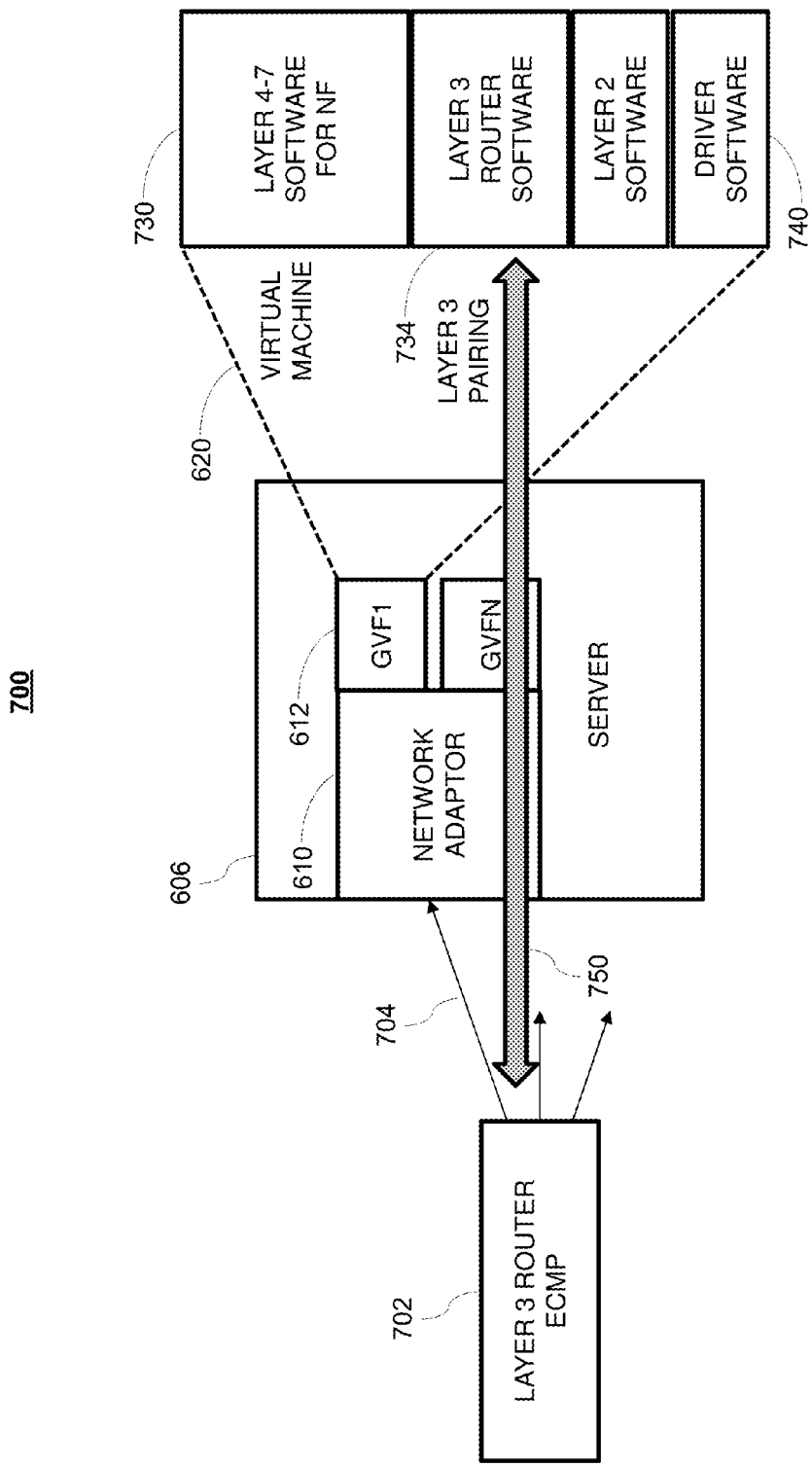
FIG. 7 is a diagram illustrating a virtualized software implementation of the network function VNF for a Layer 3 model, according to various embodiments of the invention.

FIG. 7 is a diagram illustrating a virtualized software implementation of the network function in a system using a Layer 3-type model, according to various embodiments of the invention. For purposes of brevity, the description and function of components similar to those shown in FIG. 6 is not repeated here. System 700 comprises router 702, server 606, and virtual machines 620. Router 702 is any router capable of performing layer 3 ECMP functions. Link 704 represents any IP network. Similar to FIG. 6, server 606 comprises network adaptor 610 and virtual machines 620. Virtual machine 720 may be configured to receive traffic from virtual port GVF1 within network adaptor 610 such as to pair router 702 with Layer 3 router software 734 for the subset of traffic over link 704 that is filtered to GVF1. In embodiments, virtual machines 620 use a software stack comprising Layer 4-7 software for network functions, Layer 3 router software 734, and driver software 740 to emulate the a network engine.

Figure 8:
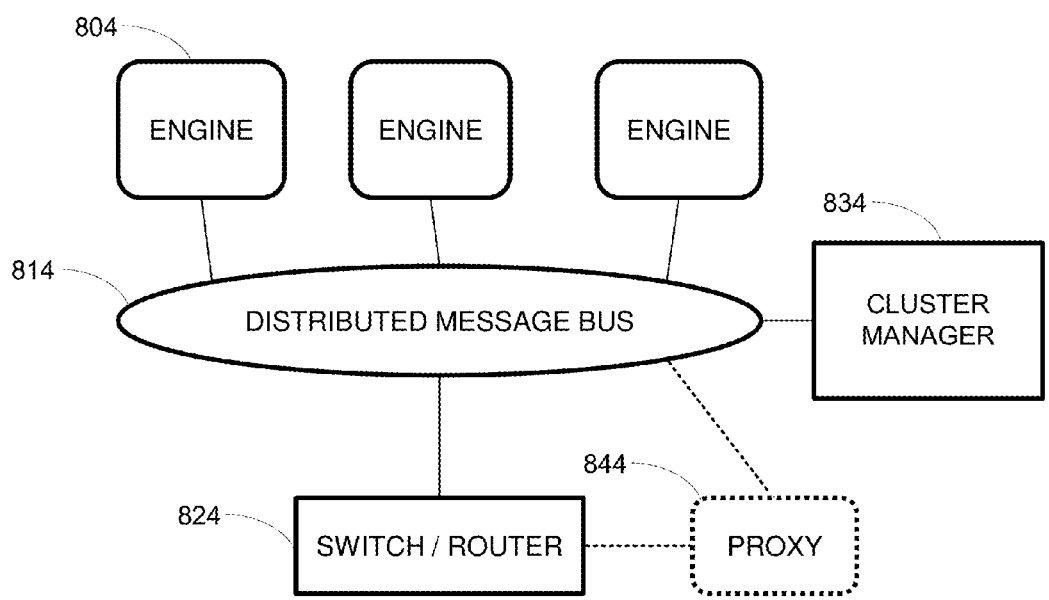
FIG. 8 illustrates a control mechanism using a message bus for managing a cluster of network engines, according to various embodiments of the invention.

FIG. 8 illustrates a loosely coupled system using a message bus to control and coordinate subsystems performing load distribution, according to various embodiments of the invention. Network 800 comprises network engines 804, message bus 814, network element 824, cluster manager 834, and optional proxy 844. Network element 824 may be any physical network device, such as a switch or a router. Cluster manager 834 is coupled to message bus 814 and, for control purposes, coupled to other entities within network 800 via message bus 814. In embodiments, normal network traffic traveling through system 800 does not reach cluster manager 834. In embodiments, message bus 814 uses a network that is different and independent from that of the normal data path in network 800, for example, to ensure control and management mechanisms are not impacted by bursts of busy periods in the data path. Furthermore, as the control channels may equally share the same physical network as data paths using common network virtualization techniques, for example via a virtual network (e.g., VLAN or VXLAN), it does not impose a material burden. Network engines 804 are configured as members of a cluster of engines. In embodiments, one or more engines 804 operate as a single logical entity.

In embodiments, messaging bus 814 is coupled to receive status reports from one or more members of each cluster to aid in the process of managing one or more engines 804. Network element 824 may participate in controlling load distribution directly or via proxy 844 (indicated by dotted lines). As depicted, message bus 814 is a distributed software messaging bus that, in embodiments, is a virtual construct that is capable of connecting to each entity in network 800 to share messages. In embodiments, distributed replication of shared information, such as forwarding tables or status information, relies on standard distributed data synchronization algorithms, for example, to achieve high availability.

In embodiments, a policy is implemented to determine the task that each entity should perform when responding to a given state of the overall system 800 to provide high scalability, high throughput, low latency, and high reliability. The policy may be based on a standard data model format and specify a set of data-driven compatibility rules, for example to correctly load balance between units within network 800, wherein messages are shared between entities via control channels of message bus 814. Entities in network 800 may be configured to broadcast messages comprising information that signals, e.g., a status of the broadcasting entity. In addition, each entity may be configured to receive status messages from other entities.

As a result, implementation of the policy provides for a very flexible "protocol" and the adaption to different use cases when managing engines 804. In embodiments, a control protocol is configured to handle tasks comprising configuring a cluster of network engines 804; adding engines 804 to a cluster; removing engines 804 from a cluster; and handling failure and high availability scenarios.

In embodiments, states related to data flow are shared with a distributed algorithm. As a result, network 800 has no central entity that can cause single point of failure or scalability limitations for data flow operations.

Figure 9:
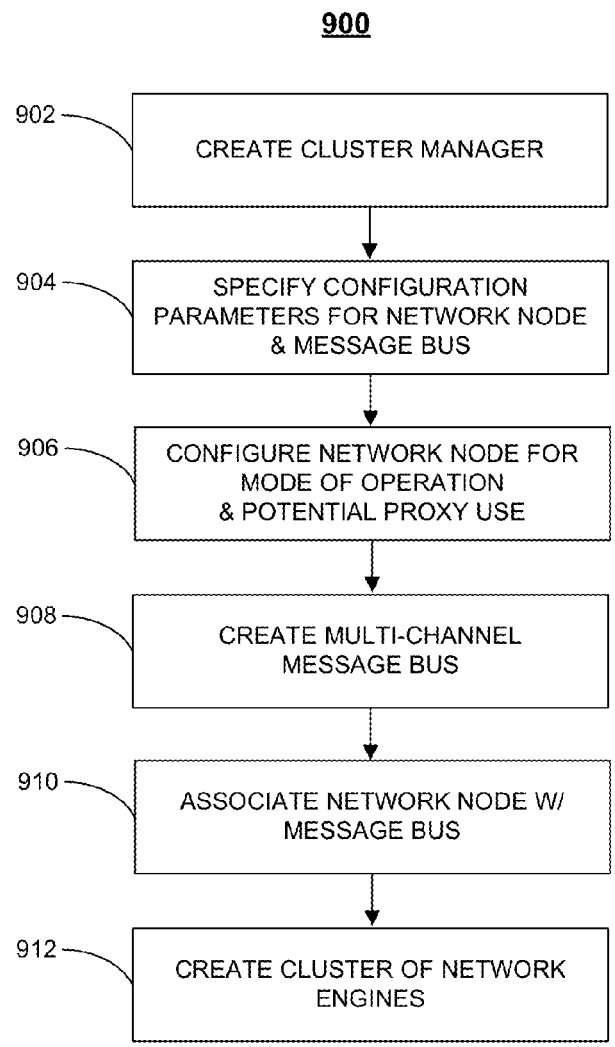
FIG. 9 is an illustrative process for initially configuring a cluster of network engines, according to various embodiments of the invention.

FIG. 9 is an illustrative process for initially configuring a cluster of network engines, according to various embodiments of the invention. The process for configuring starts at step 902 by creating a cluster manager.

At step 904, the cluster manager specifies parameters for configuring a network node and a message bus associated with the network node. In embodiments, the message bus is a virtualized entity.

At step 906, the network node is configured according to a regular mode of operation and a potential proxy use. In embodiments, the network node is configured for operation in one of four scenarios: combining one of an L2 mode and L3 with one of a hardware and a proxy mode. While particular configuration parameters for each combination may be altered, for example for operation in an L2 mode, the parameters may use name identifiers to configure the network node such as to create a link aggregation group and prepare for adding new links to (or removing existing links from) the group. Similarly, for operation in an L3 mode, the node parameters are configured to create a forwarding table entry to perform ECMP forwarding in Layer 3.

At step 908, the message bus having message bus channels capabilities is created.

At step 910, the network node is associated with the multi-channel message bus, such that the network node can announce itself on each of the message bus channels.

At step 912, the cluster manager creates one or more network engines. Each network engine being associated with the message bus.

In embodiments, for example where commercial equipment is used that does not allow for the configuration of empty groups or an ECMP forwarding entry having no next hop member, steps 902-912 may be combined with steps for adding an engine, described next, to serve as an "initial configuration."

Figure 10:
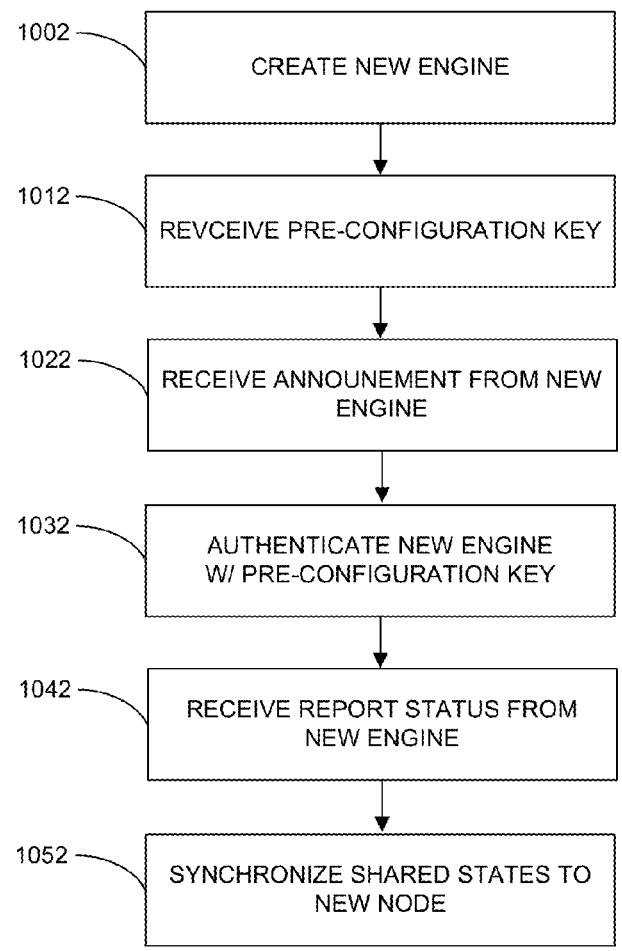
FIG. 10 is an illustrative process for adding an engine to a cluster of network engines, according to various embodiments of the invention.

FIG. 10 is an illustrative process for adding an engine to a cluster of network engines, according to various embodiments of the invention. The process for adding an engine starts at step 1002 when a cluster manager creates a new engine.

At step 1012, a pre-configuration key provided by the cluster manager is received on a message bus. The new engine may be created as a unit of virtual compute (e.g., a virtual machine or container). In embodiments, the cluster manager provides a message bus identifier to the new engine in the process of creating and initially configuring the new engine.

At step 1022, in response to the new engine receiving a message bus identifier from the cluster manager and joining an existing cluster, an announcement, for example via a broadcast channel, is received on the message bus from the new engine.

At step 1032, if security is required, the new engine is authenticated by the cluster manager using the pre-configuration key. In embodiments, the choice of authentication protocol is application specific and independent of a cluster design. For example, SSH and public key based authentication may be used on existing commercial systems.

At step 1042, the new engine and the network node reconfigure and report their status on the messaging bus to the cluster manager and all present engines, in response to cluster manager reconfiguring the new engine and the network node. In embodiments, the content of messages depends on configuration states of the network node and the network engines, and may be determined based on the underlying network mode of operation, such as link aggregation, policy based routes, access control lists, OpenFlow. For modes of operation that have well-defined interface and message types for performing this task, e.g., OpenFlow, the messages are designed to interoperate with each other. In embodiments, where commercial systems use formats, such as Command Line Interface (CLI) text format, SNMP MIB management format, or NETCONF/YANG format, the messages may be defined to emulate such mechanisms on the message bus. For newly created systems, messages and the message exchange protocol may be optimized independent of the overall design and operation of the system shown in FIG. 8.

At step 1052, shared states are synchronized to the new node. If the new engine is not the first engine, then shared states may be synchronized to the new node by replication through messages in the message bus. Such synchronization may be ongoing processes and they may be configured according to the different time constraints of the specific applications.

Figure 11:
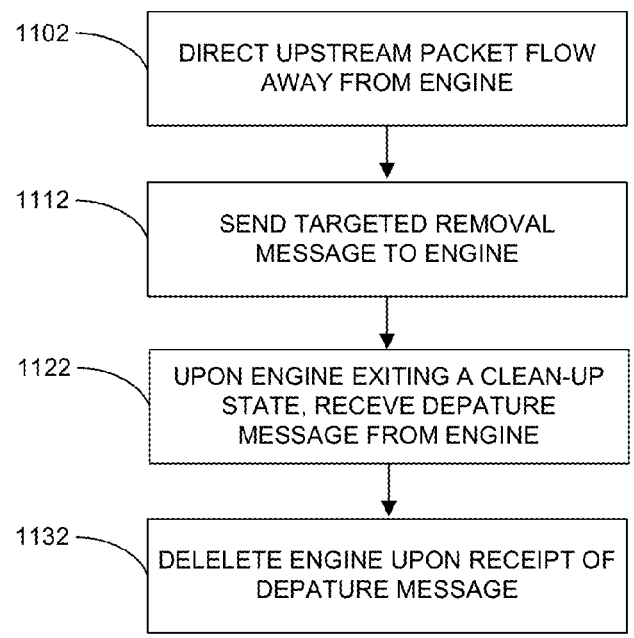
FIG. 11 is an illustrative process for removing an engine from a cluster, according to various embodiments of the invention.

FIG. 11 is an illustrative process for removing an engine from a cluster for normal operational (e.g., to reclaim unused excessive compute resources), according to various embodiments of the invention. The removal process starts at step 1102 when the cluster manager diverts upstream packet flow in a network node away from a to-be-removed engine. In existing commercial products this may be achieved, for example, by one of link aggregation, policy based routes, access control lists, or OpenFlow either directly, for systems that support native OpenFlow, or via a proxy, which translates between an existing system and an OpenFlow controller.

At step 1112, the cluster manager sends a targeted message to the engine for removal. Upon receipt of that message, the engine may enter into a clean-up state, which may involve waiting until the processing of existing queued packets is completed, and reporting each necessary status and/or statistic.

At step 1122, the engine reports a departure message to a broadcast channel.

At step 1132, the cluster manager, upon receiving the departure message, removes the engine.

Figure 12:
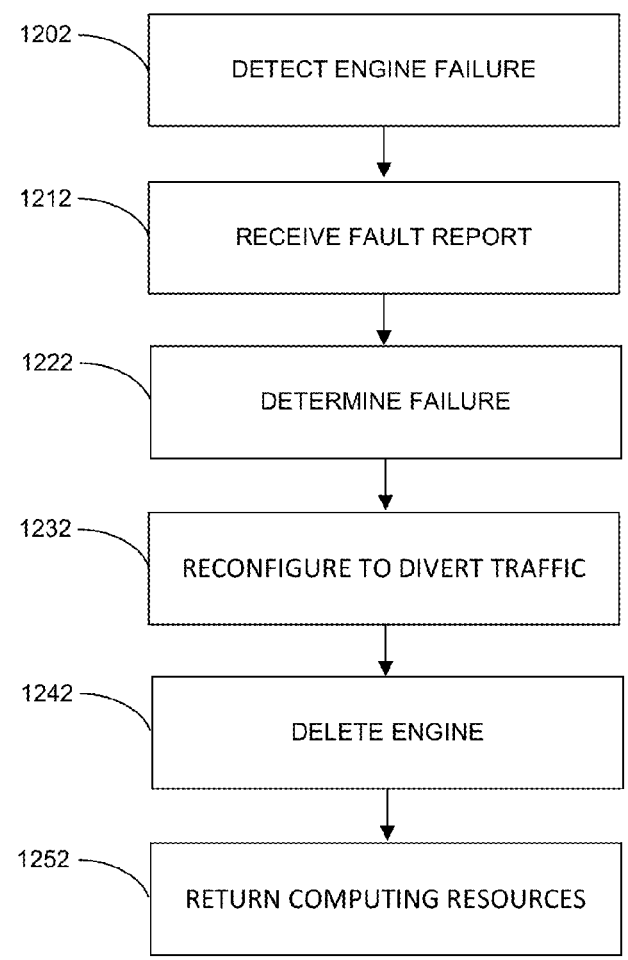
FIG. 12 is an illustrative process for removing an engine having a fault condition from a cluster, according to various embodiments of the invention.

FIG. 12 is an illustrative process for removing a faulty engine form a cluster, according to various embodiments of the invention. The removal process starts at step 1202 by detecting an engine failure that is caused by a fault condition, such as a software crash, hang, or other malfunction that results in an unrecoverable or inconsistent state. In embodiments, all members of the cluster participate in the detection of the fault condition and communicate via the message bus or existing data path fault detection mechanisms (e.g., keep alive status). The exact choice of fault detection and network engine failure determination algorithms may be application specific and is independent of the process shown in FIG. 12.

At step 1212, the cluster manager receives a fault report from the networking node and/or members of the cluster and, at step 1222, makes a determination of the engine's failure.

At step 1232, the cluster manager diverts traffic away from the failed engine by reconfiguring the network node.

At step 1242, the cluster manager removes the failed engine and, at step 1252, returns compute resources back to the infrastructure layer.

It is noted that while network nodes may be implemented as single switching or routing elements in a network fabric, e.g., as a virtual switch or virtual router, a network node may equally be implemented as a standby or high availability construct. The supporting mechanisms, such as hot standby and VRRP, also support L2 or L3 modes. Regarding the failure of an entire networking node, mechanisms similar to those described above may be adopted.

As a result, even in scenarios when only a single element (physical or virtual) is used and experienced a failure (or if elements within a high availability configuration all fail all at the same time) and, thus, the logical entity (VNF) fails, because the failure involves a logical entity that was constructed by a cluster manager, the cluster manager may reconstruct the failed entity on the virtual infrastructure within a relatively short period of time. The reconstruction time may range from sub-seconds to minutes, which is considerably faster than the time required to perform a physical system repair and even faster than a reboot cycle.

Figure 13:
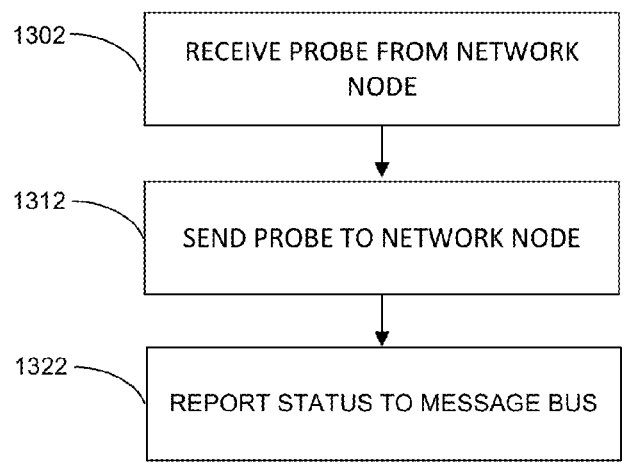
FIG. 13 illustrates the process for handling a failed link between a node and a member engine, according to various embodiments of the invention.

FIG. 13 illustrates an example of the process for handling a failed link between a node and a member engine, according to various embodiments of the invention. In embodiments, the failed link is a virtual path between a networking node and an engine. Virtual paths have an inherent resiliency provided by the lower layer transport, such as spanning tree or dynamic routing, that would recover from physical transport failures.

The process for handling the failed link begins at step 1302 when an engine receives, via a data path, a probe form a network node. In embodiments, probes to all engines of the cluster may be scheduled to occur at predetermined time intervals (e.g., per time period T). Other procedures of detecting link failure are equally possible. For example, link status reports may be received from an underlying fault management system or, for OpenFlow, from an SDN controller. The exact choice of the mechanism is independent of the design outlined here.

At step 1312, the engine, outside of the data path, sends via a message bus a probe to the network node, while members of the cluster exchange status in response to probes via the messaging bus, at step 1322. As a result, the messaging bus provides to the cluster an out-of-band control plane for path management, while the data path provides an in-band, keep-alive periodic packet probe (ping). In embodiments, each engines in the cluster is scheduled to send to the networking node a probe at a predetermined time interval.

In embodiments, status may be categorized as Healthy, Warning, or Failure, wherein the status Failure indicates a failure to receive probes in N consecutive probe periods T; the status Warning indicates a failure to receive a single probe, or a detection of a latency or latency variations in two or more probes; and the status Healthy indicates any scenario not covered by any other status.

In embodiments, each member, networking node, any of its standby nodes, or engine, report status on the messaging bus.

One skilled in the art will appreciate that the mechanisms defined by standard L2 Layer link aggregation for detecting path failures and accompanying procedures for diverting traffic from a failed path may be adopted for the virtual paths in the present invention. Similarly, the mechanisms defined for ECMP in an L3 Layer, which depends on a dynamic routing protocol (e.g., OSPF, BGP) to detect path failures and update routing tables that then redirect traffic, may be adopted for the virtual paths in the present invention.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 14:
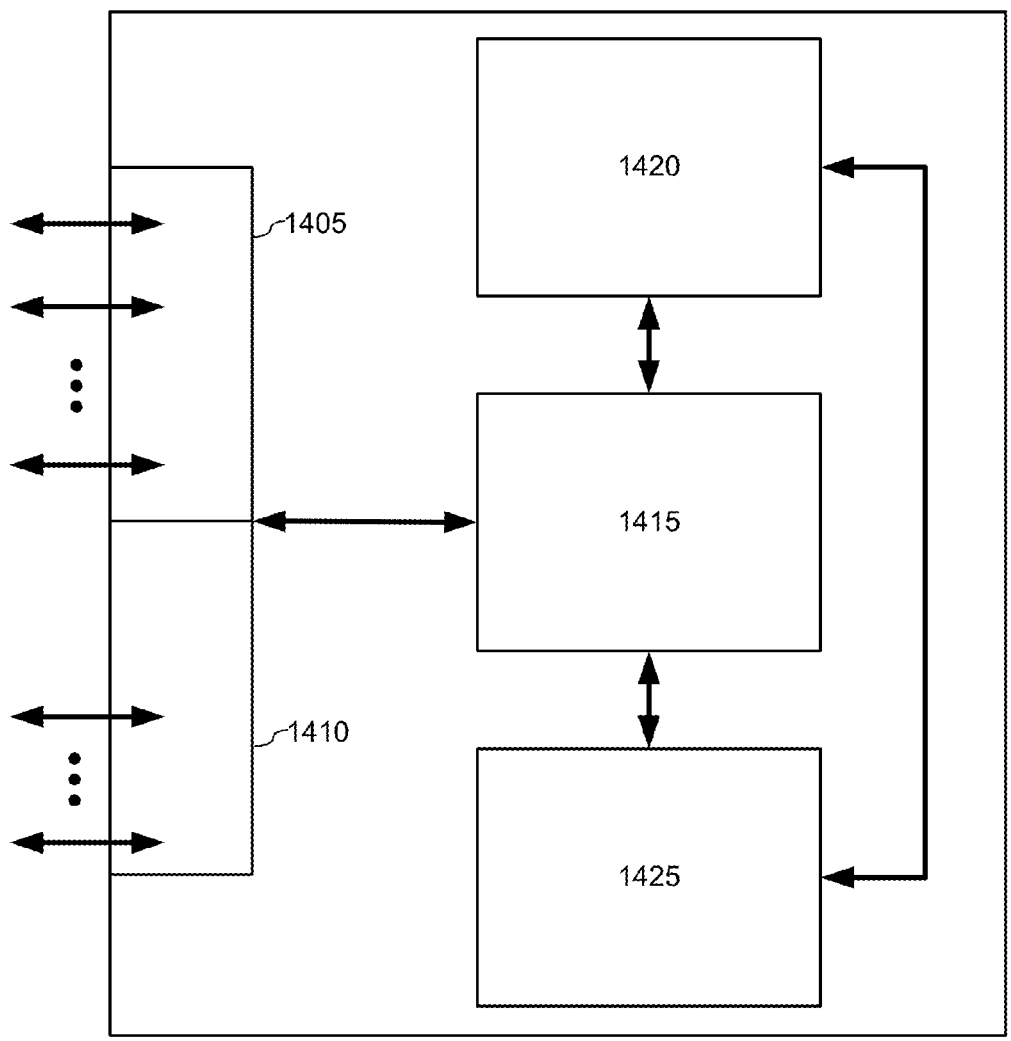
FIG. 14 depicts a simplified block diagram of an information handling system according to various embodiments of the present invention.

FIG. 14 depicts a simplified block diagram of an information handling system according to various embodiments of the present invention. It is understood that the functionalities shown for device 1400 may operate to support various embodiments of an IHS (or node)—although it is understood that an IHS may be differently configured and include different components. IHS 1400 may include a plurality of I/O ports 1405, bus 1410, network processing unit (NPU) 1415, one or more tables 1420, and CPU 1425. The system includes a power supply (not shown) and may also include other components, which are not shown for sake of simplicity.

In embodiments, I/O ports 1405 are connected via one or more cables to one or more other network devices or clients. Network processing unit 1415 may use information included in the network data received at node 1400, as well as information stored in table 1420, to identify a next hop for the network data, among other possible activities. In embodiments, a switching fabric then schedules the network data for propagation through the node to an egress port for transmission to the next hop.

It is noted that aspects of the present invention may be encoded on one or more non-transitory computer-readable media with instructions for one or more processors to cause steps to be performed. It is also noted that the non-transitory computer-readable media may include volatile and non-volatile memory. It is noted that alternative implementations are possible, including hardware and software/hardware implementations. Hardware-implemented functions may be realized using ASICs, programmable arrays, digital signal processing circuitry, and the like. Accordingly, the "means" terms in any claims are intended to cover both software and hardware implementations. Similarly, the term "computer-readable medium or media" as used herein includes software and/or hardware having a program of instructions embodied therein, or a combination thereof. With these implementation alternatives in mind, it is understood that the figures and accompanying description provide the functional information one skilled in the art would require to write program code (i.e., software) and/or to fabricate circuits (i.e., hardware) to perform the processing required.

One skilled in the art will recognize that no particular IHS, protocol, or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An information handling system for communicating with one or more virtual network engines, the information handling system comprising:
   one or more network interfaces communicatively connected to a network fabric that supports a plurality of virtual connections to a plurality of instances of a network engine operating on one or more hosts, the one or more hosts communicatively connected to the network fabric;
   one or more processors that are communicatively coupled to the one or more network interfaces;
   a non-transitory memory comprising one or more sequences of instructions that, when executed by the one or more processors, cause steps to be performed comprising forming a virtual connection to each of the plurality of instances of the network engine, the virtual connection facilitating data traffic between the information handling system and the instance of the network engine; and
   a load balancing module, communicatively coupled to the one or more processors, that performs load balancing of the data traffic across at least some of the plurality of virtual connections.

2. The information handling system according to claim 1 wherein the non-transitory memory further comprises one or more sequences of instructions which, when executed by the one or more processors, causes steps to be performed comprising:
   responsive to a new instance of the network engine being created on the one or more hosts, forming a new virtual connection to the new instance of the network engine; and
   responsive to the instance of the network engine ceasing to operate, removing the instance of the network engine.

3. The information handling system according to claim 1, wherein each instance of the network engine in the plurality of instances of network engines emulate a network layer pairing.

4. The information handling system according to claim 3 wherein the network layer pairing is at Layer 3 and the plurality of instances of network engines form separate logical units regardless of whether one or more of the instances of the network engine operate on a same host, and the plurality of virtual connections form an Equal Cost Multi-Path.

5. The information handling system according to claim 3 wherein the network layer pairing is at Layer 2 and the plurality of virtual connections form a link aggregation group.

6. The information handling system according to claim 5 wherein two or more of the plurality of instances of network engines form a single logical entity.

7. The information handling system according to claim 1, wherein two or more of the plurality of instances of the network engine operate on one of the one or more hosts.

8. An information handling system for communicating with virtual network engines, the information handling system comprising:
   one or more hosts connected to a network fabric that is communicatively connected to one or more network interfaces; and
   a plurality of instances of a network engine operating on the one or more hosts, the network fabric supporting a plurality of virtual connections between a network device and each of the plurality of instances of the network engine to receive data traffic from the network device, the virtual connections being formed in response to one or more sequences of instructions held in a non-transitory memory being executed by one or more processors that are communicatively coupled to the one or more network interfaces and to a load balancing module that performs load balancing of the data traffic across at least some of the plurality of virtual connections.

9. The information handling system according to claim 8, wherein each instance of the network engine in the plurality of instances of network engines emulate a network layer pairing.

10. The information handling system according to claim 9 wherein the network layer pairing is at Layer 2 and the plurality of virtual connections form a link aggregation group.

11. The information handling system according to claim 10 wherein the network layer pairing is at Layer 3 and the plurality of instances of network engines form separate logical units regardless of whether one or more of the instances of the network engine operate on a same host, and the plurality of virtual connections form an Equal Cost Multi-Path.

12. The information handling system according to claim 8, wherein the plurality of instances of the network engine is configured to communicate with each other and one of a network node and a proxy for a network comprising the network node via a distributed message bus using a messaging protocol to distribute control messages.

* * * * *